US010604908B2

(12) United States Patent
Erez et al.

(10) Patent No.: US 10,604,908 B2
(45) Date of Patent: Mar. 31, 2020

(54) GEOCELL FOR MODERATE AND LOW LOAD APPLICATIONS

(71) Applicant: GeoTech Technologies Ltd., Tel Aviv (IL)

(72) Inventors: Oded Erez, Tel Aviv (IL); Adi Erez, Tel Aviv (IL); Izhar Halahmi, Hod-Hasharon (IL)

(73) Assignee: GEOTECH TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 14/623,922

(22) Filed: Feb. 17, 2015

(65) Prior Publication Data

US 2016/0244935 A1   Aug. 25, 2016

Related U.S. Application Data

(60) Division of application No. 13/418,840, filed on Mar. 13, 2012, now Pat. No. 8,956,085, which is a continuation of application No. 13/411,298, filed on Mar. 2, 2012, now Pat. No. 8,950,982.

(60) Provisional application No. 61/597,652, filed on Feb. 10, 2012.

(51) Int. Cl.
| | |
|---|---|
| *E01C 3/04* | (2006.01) |
| *E02D 17/20* | (2006.01) |
| *A01G 9/033* | (2018.01) |
| *E01C 3/00* | (2006.01) |
| *E02B 5/02* | (2006.01) |
| *E02B 7/02* | (2006.01) |
| *E02D 27/40* | (2006.01) |
| *E02D 29/02* | (2006.01) |

(52) U.S. Cl.
CPC .......... *E02D 17/202* (2013.01); *A01G 9/033* (2018.02); *E01C 3/00* (2013.01); *E01C 3/04* (2013.01); *E02B 5/02* (2013.01); *E02B 7/02* (2013.01); *E02D 27/40* (2013.01); *E02D 29/02* (2013.01); *E02D 2300/0006* (2013.01); *E02D 2300/0084* (2013.01); *E02D 2600/30* (2013.01); *Y10T 428/24157* (2015.01)

(58) Field of Classification Search
CPC ........................................................ E01C 3/04
See application file for complete search history.

(56) References Cited

U.S. PATENT DOCUMENTS

| | | |
|---|---|---|
| 2010/0080659 A1 | 4/2010 | Halahmi et al. |
| 2010/0254795 A1 | 10/2010 | Halahmi et al. |
| 2011/0243670 A1 | 10/2011 | Erez et al. |
| 2011/0304080 A1 | 12/2011 | Halahmi et al. |
| 2013/0209179 A1 | 8/2013 | Erez et al. |

OTHER PUBLICATIONS

'Geocell, Cellular geosynthetic for retention of soil on slopes'. Information sheet [online], Permathene Ltd., Sep. 2007.
International Search Report dated Jun. 6, 2012 for U.S. Appl. No. 13/411,298.
Internet Article "Asia Ruijie Geosytnthetics Co., Ltd." (www.geosupply.asia/ArticleShow); Sep. 3, 2010, pp. 1-3.

(Continued)

*Primary Examiner* — Sunil Singh
(74) *Attorney, Agent, or Firm* — Fay Sharpe LLP

(57) ABSTRACT

Geocells for moderate to low load applications are disclosed here. The geocells have a cell wall thickness of from 0.25 mm to 0.95 mm. They have a wall strength of from 3500 N/m to 15000 N/m.

15 Claims, 12 Drawing Sheets

(56) References Cited

OTHER PUBLICATIONS

Internet Article "Asia Ruijie Geosytnthetics Co., Ltd." (www.topfreebix.com/product); Aug. 2, 2011, pp. 1-2.
Internet Article "CNBM International Corporation" (www.topfreebiz.com/product); Aug. 25, 2011, pp. 1-2.
Internet Article "EGA 30 Geocell", p. 1, Apr. 2007.
Internet Article "Shantou Shanzhang Machinery Manufacturing Co. Ltd", p. 3, Apr. 2010.
Internet Article "Thickness Geocell", shows date of (Shantou Shanzhang Machinery Manufacturing Co. Ltd).
Internet Article "EGA 30 Geocell", shows date of (EGA 30 Geocell).

GEOCELL FOR MODERATE AND LOW LOAD APPLICATIONS

This application is a divisional of U.S. patent application Ser. No. 13/418,840, filed Mar. 13, 2012, now U.S. Pat. No. 8,956,085, which was a continuation of U.S. patent application Ser. No. 13/411,298, filed Mar. 2, 2012, now U.S. Pat. No. 8,950,982, which claimed priority to U.S. Provisional Patent Application Ser. No. 61/597,652, filed on Feb. 10, 2012, the entirety of which are both hereby fully incorporated by reference herein.

BACKGROUND

Geocells (also known as cellular confinement systems) are a three-dimensional geosynthetic product which are useful in applications such as soil erosion prevention, channel lining, construction of reinforced soil retaining walls, and support of pavements. The geocell was originally designed by the United States Army Corps of Engineers (ACE) for fast deployment of troops on sandy dunes which generally could not support the load of heavy vehicles (e.g. trucks, tanks, etc).

As described in U.S. Pat. No. 4,797,026, the geocell as contemplated for military applications was made of several strips of high density polyethylene (HDPE), with each strip having a wall thickness of 1.27 mm (0.05 inches). The strips were welded together in an offset manner by ultrasonic welder, with the distance between welded seams being 330 mm or greater.

The construction of geocells has not changed much in these basic characteristics in the last few decades. Geocells are manufactured today by many tens of manufacturers along the world. The vast majority of geocells are still made of HDPE, with a very few being made of polypropylene (PP). The usual strip wall thickness is 1.27 millimeters, with a few variations in the range of 1.0 mm to 1.7 mm. The cell walls are frequently perforated and embossed; see for example U.S. Pat. Nos. 6,296,924; 6,395,372; and 4,965,097; and U.S. Patent Pub. No. 2006/0147276. Some manufacturers vary their cells slightly either by changing the perforation pattern or by offering larger cells (i.e. the distance between seams is greater than 330 mm). Regardless of these variations, the original cell wall thickness originated by the ACE has not changed and is always, without exception, by all manufacturers in the range of 1.0 mm to 1.7 mm, so that the geocell has a wall strength of from 15,000 to 23,000 N/m (Newton per meter), respectively.

During the last few decades, some additional geotechnical applications of the original geocell design have been developed, for example the use of geocells in slope soil stabilization (mainly for erosion control), retaining walls, channel protection (mainly for erosion control), temporary pavements, or light duty pavements. However, the design of the geocell has not been changed or optimized for each new application. Because the original geocell design has not been changed and is not optimized, the relatively high cost of product, cost of shipment and cost of installation are limiting factors in expanding the use of goecells and increasing the market size for such products.

It would be desirable to provide geocells that meet relevant engineering requirements such as strip strength, seam strength, and sufficient vertical stability and stiffness to survive possible installation damage during the in-situ infilling process, yet are lower in cost, easier to install, and do not present sheer waste due to over-design.

BRIEF SUMMARY

Disclosed in various embodiments are geocells that are suitable for applications that only need moderate load support, in contrast to high load support applications. Such geocells can be made with lower wall thicknesses. As a result, the cost of these geocells can be reduced without sacrificing needed performance.

These and other embodiments are described in more detail below.

DESCRIPTION OF THE FIGURES

The following is a brief description of the drawings, which are presented for the purposes of illustrating the exemplary embodiments disclosed herein and not for the purposes of limiting the same.

DETAILED DESCRIPTION

The following detailed description is provided so as to enable a person of ordinary skill in the art to make and use the embodiments disclosed herein and sets forth the best modes contemplated of carrying out these embodiments. Various modifications, however, will remain apparent to those of ordinary skill in the art and should be considered as being within the scope of this disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Figure 1:
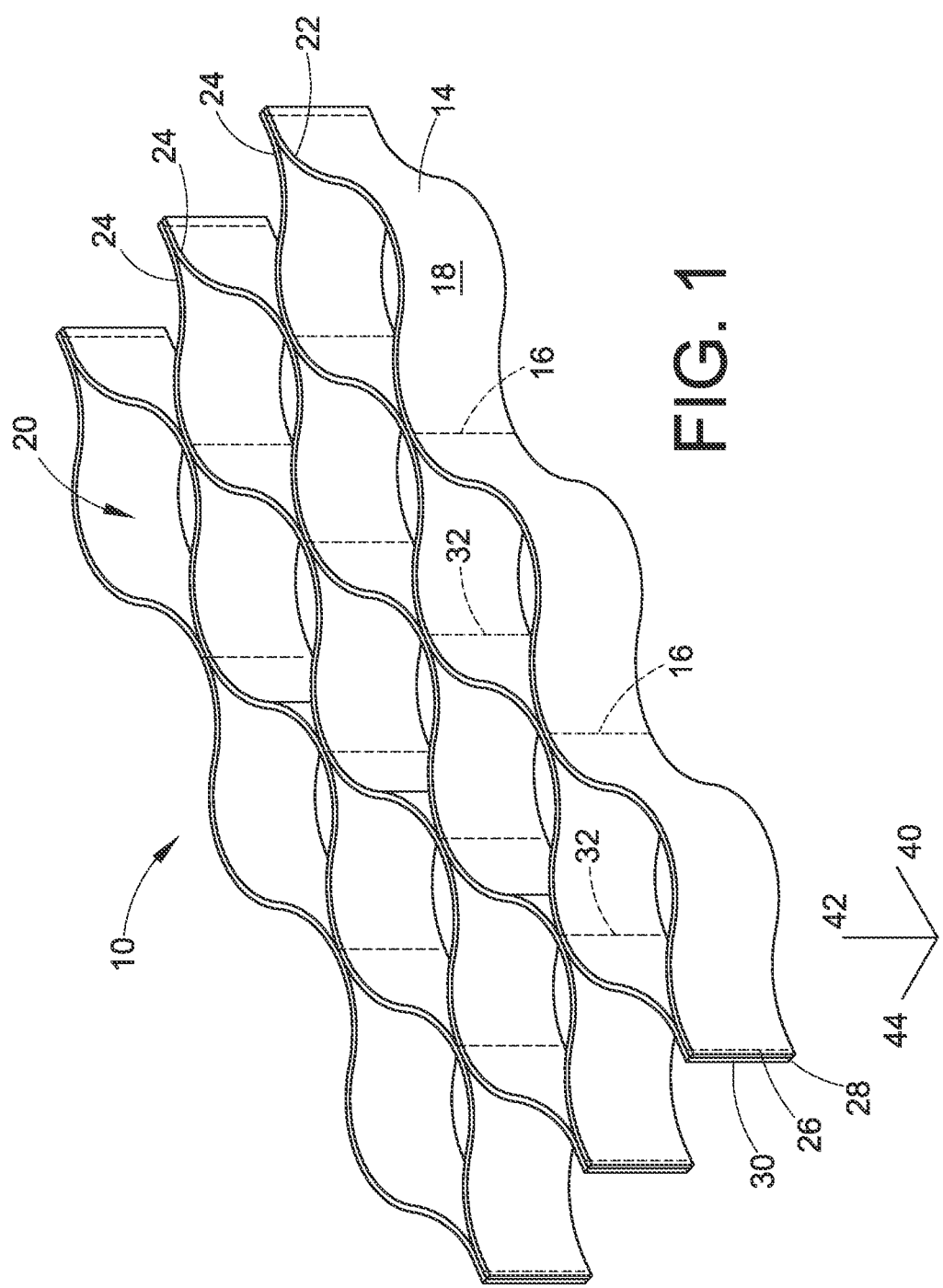
FIG. 1 is a perspective view of a geocell in its expanded state.

Initially, FIG. 1 is a perspective view of a geocell in its expanded state. The geocell 10 comprises a plurality of polymeric strips 14. Adjacent strips are bonded together along discrete physical seams 16. The bonding may be performing by bonding, sewing or welding, but is generally done by welding. The portion of each strip between two seams 16 forms a cell wall 18 of an individual cell 20. Each cell 20 has cell walls made from two different polymeric strips. The strips 14 are bonded together so that when expanded, a honeycomb pattern is formed from the plurality of strips. For example, outside strip 22 and inside strip 24 are bonded together at seams 16 which are regularly spaced along the length of strips 22 and 24. A pair of inside strips 24 is bonded together along seams 32. Each seam 32 is between two seams 16. As a result, when the plurality of strips 14 is stretched or expanded in a direction perpendicular to the faces of the strips, the strips bend in a sinusoidal manner to form the geocell 10. At the edge of the geocell where the ends of two polymeric strips 22, 24 meet, an end weld 26 (also considered a joint) is made a short distance from the end 28 to form a short tail 30 which stabilizes the two polymeric strips 22, 24. This geocell may also be referred to as a section, particularly when combined with other geocells over a larger area than could be practically covered by a single section.

Figure 2:
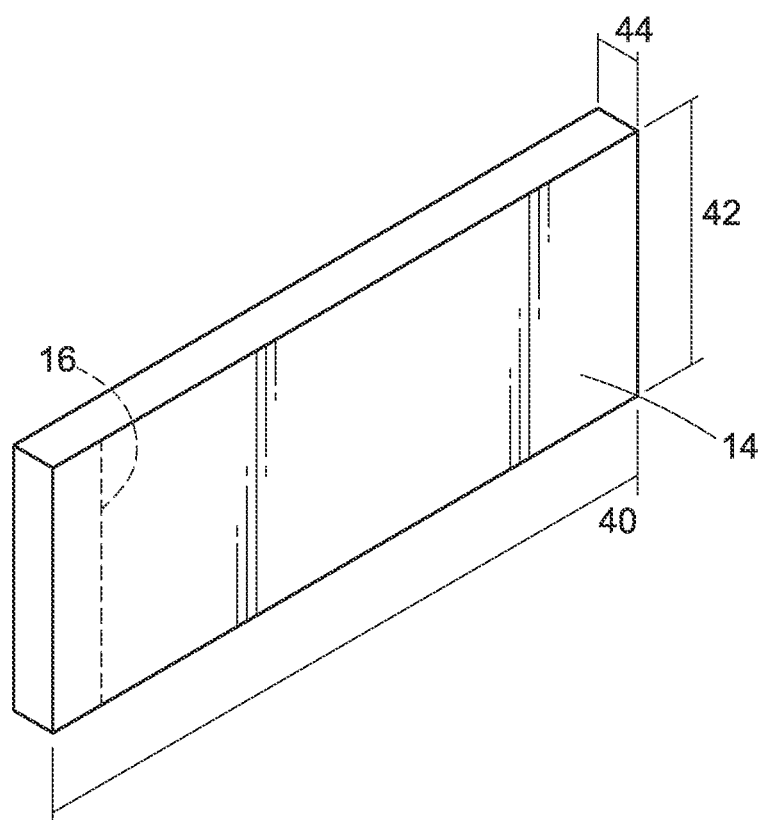
FIG. 2 is a closeup perspective view of a polymeric strip.

Each polymeric strip has a length 40, a height 42, and a thickness 44, which are measured in the direction indicated. The length is measured when the geocell is in its folded or compressed state. In the compressed state, each cell 20 may be considered to have no volume, whereas the expanded state generally refers to when the geocell has been expanded to its maximum possible capacity. FIG. 2 is a closeup perspective view of a polymeric strip 14 showing the length 40, height 42, and thickness 44, with a seam 16 illustrated for reference.

Figure 3:
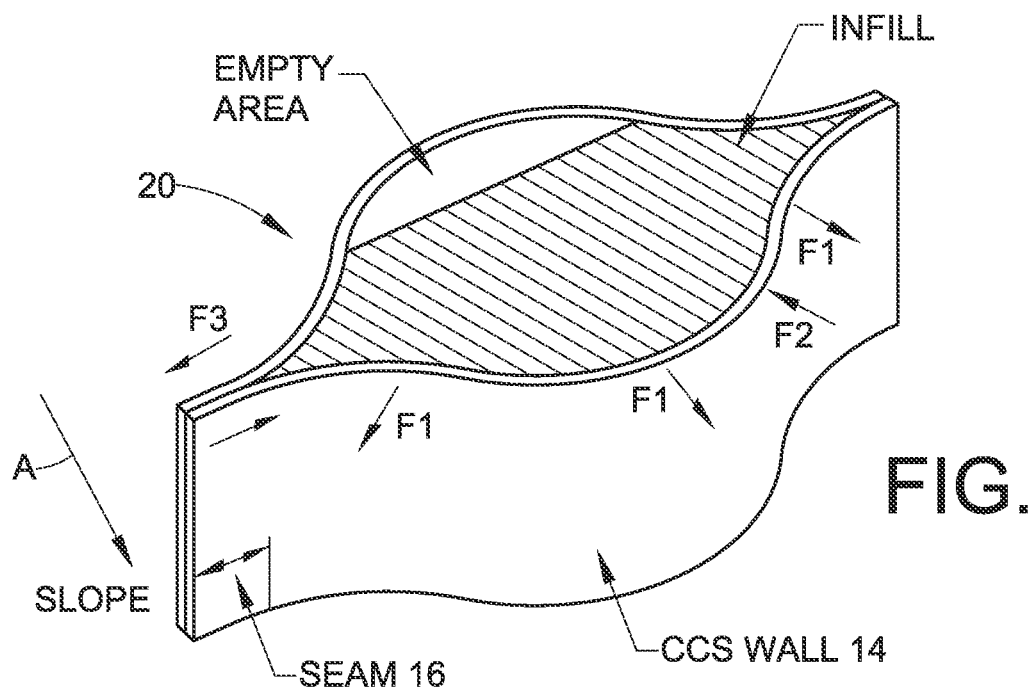
FIG. 3 is a perspective view of a single cell in a geocell which contain infill material.

FIG. 3 is a perspective view of a single cell 20 in a geocell which contain infill material. The cell 20 is depicted as it might appear when the CCS is located on a slope (indicated by arrow A), so that the infill retained within the cell 20 has settled substantially horizontally (i.e. flat relative to the earth's surface), while the cell walls 14 of the CCS 10 are substantially perpendicular to the slope A on which the CCS is located. Because the cell walls 14 are not aligned horizontally with the infill, the infill settles substantially on the down-slope cell wall and an "empty area" can be left on the up-slope cell wall.

The cell walls 14 are subject to the forces F1 and F2. As a result of the tilting, force F1 (exerted by the weight of the infill) and force F2 (exerted by the empty area of an adjacent down-slope cell) are not balanced. Force F1 is greater than force F2. This unbalanced force stresses the seam 16. In addition, the infill exerts a separation force F3 against the seams 16 as well. This separation force results from the mass of the infill and natural forces. For example, the infill will expand (in volume) during humid periods as it retains water. The infill will also expand and contract, e.g. from repeated freeze-thaw cycles of water retained within the cell 20. This shows the importance of a strong weld at each seam 16. It should be noted that forces act against the cell walls and the seams no matter what the orientation of the geocell is.

Figure 4:
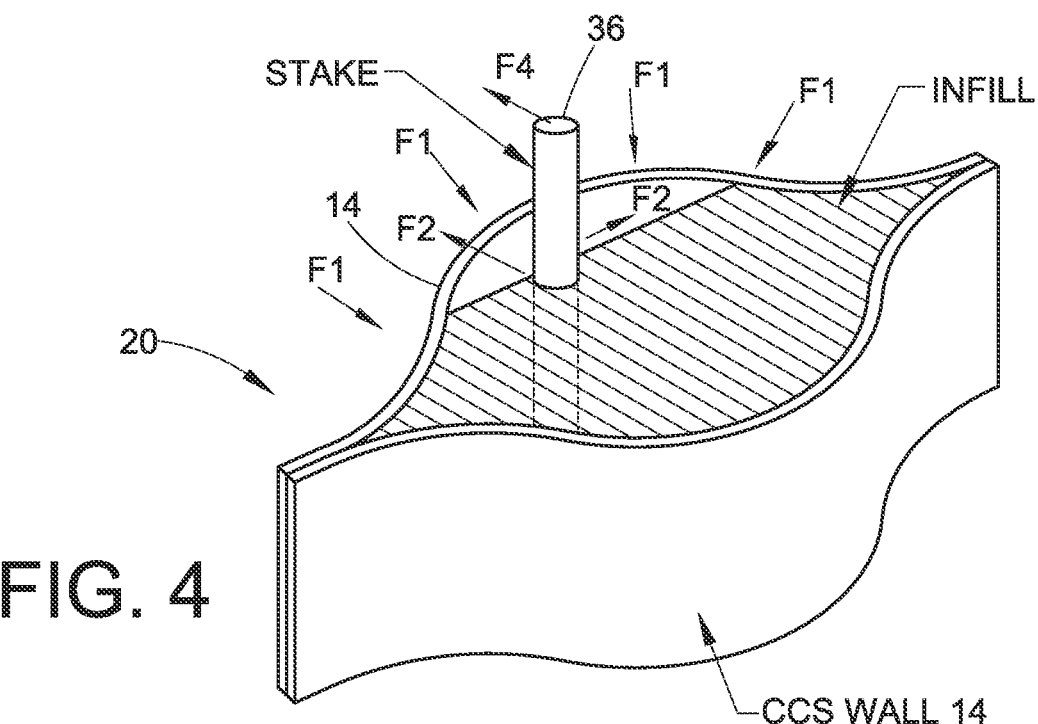
FIG. 4 is a perspective view of a single cell containing infill and a stake or anchor.

FIG. 4 is a perspective view of a single cell 20 containing infill and a stake or anchor 36 (i.e. clip, peg, etc.). The stake 36 applies an additional force F4 on the up-slope cell wall to aid in balancing the forces on the cell walls 14. Such stakes are well-known, as are other variations such as J-hooks, T-hooks, etc. Besides anchoring the geocell in place, stakes are also useful for connecting adjacent geocells together.

The geotechnical market is very diverse and geocells may be subjected to high load applications such as:
- A1: retaining walls having a slope of 85 degrees or greater;
- A2: steep slopes having a slope greater than about 65 degrees, or when the slope height is greater than 6 meters and the stake density is lower than 0.5 per square meter ($m^2$); or
- A3: heavily loaded pavements, railways, and parking yards where a geocell is placed in the base.

Geocells can also be subjected to moderate or low loads such as:
- B1: reinforced retaining walls having a slope of lower than 85 degrees, regardless of the height;
- B2: slopes in which the stake density is equal or greater than 0.65 per square meter or the slope is less than 30 degrees;
- B3: channel lining in which the stake density is equal or greater than 0.65 per square meter or when the water flow rate is lower than 10 m/sec;
- B4: moderate- to low-loaded pavements and parking yards where a geocell is placed in the base or sub-base or subgrade, or heavily loaded pavements, railways, and parking yards where a geocell is placed below the base layer in the sub-base and/or the sub-grade for the purpose of reinforcing poor native soil or lower quality infill.
- B5: reinforced retaining walls having a slope from 60 to 85 degrees;
- B6: moderate- to low-loaded pavements, railways, and parking yards where a geocell is placed in the base or sub-base or subgrade;
- B7: walkways;
- B8: bicycle paths;
- B9: tree root protection;
- B10: vegetated roof covering;
- B11: protection of waterproofing lining;
- B12: dams and floodgates against floods and overflowing;
- B13: barriers to stop soil erosion; and
- B14: terraces for management of soil sediments.

Today, the geocells available in the market are not "tailored to market specification" but are instead "one size fits all". Most of them are made of high density polyethylene (HDPE) or polypropylene (PP), except for some novel alloy geocells such as those disclosed in U.S. Pat. No. 8,025,457. HDPE and PP are not suitable for taking the loads in the base layer of heavily loaded pavements, railways and parking yards, but on the other hand are over-designed for moderate or low load applications. This over-designing of conventional geocells makes them overly expensive and difficult to install for moderate or low load applications.

Despite the many engineering advantages of geocells over other geosynthetics in soil reinforcement and stabilization, the penetration to the soil reinforcement and stabilization market is marginal. Two major reasons for the poor market penetration are:
Price is expensive—especially relative to other geosynthetic solutions, such as for example geogrids and geotextiles; and
Installation is labor intensive and sometimes costs more than the geocell itself (per unit of expanded area). The labor cost correlates to the wall thickness of the geocell. The thicker the wall, the more difficult and expensive the installation. This correlation becomes even greater at cold climates and steep slopes.

As a result, today, only a small portion of the potential market for geocells has been realized due to product cost, shipment cost and installation cost. It is important to mention that the product cost is proportional to the material weight per unit expanded area, and the shipment cost per unit expanded area decreases as wall thickness decreases. The installation of geocells is a complicated process of shipping the geocell(s) by pallet to the worksite, expansion of each geocell, connecting to adjacent geocells, using stakes to maintain the geocell in an expanded state, and infilling. Generally, the thicker the wall of the geocell, the more expensive the total material will be, the more expensive the shipment cost will be, and the more costly the installation will be per unit expanded area.

The present disclosure thus relates to geocells that are specifically tailored to market segments which cannot afford to use current geocell solutions today because of the imbalance between their cost and required performance. Generally, optimization of the wall thickness, the polymer type, and the cell size and height enables the strip strength in the geocell to be matched to the level sufficient for the given application (sufficient level means the calculated value multiplied by commonly used safety or reduction factors), and as a result making the geocell more economical and easier to install.

In this regard, it should be noted that in geocell applications such as retaining walls, slope protection, and channel protection, the seam (where adjacent strips are bonded together) is the weakest point of the geocell structure. Because the seam splitting strength of prior art geocells is partially correlated to the strip strength, prior art geocells tend to fail at their seams at loads of 50-80% of the strip strength. The practical aspect of this is that the extra strength of the cell wall is not utilized and the system fails at the weakest point. This is not economical because the overall geocell performance, like any engineering system is controlled by its weakest point. Put another way, the increased strip strength is not needed. Surprisingly, the geocells of the present disclosure exhibit a better balance between seam strength and strip strength, so the ratio of cost to performance is better than that for prior art geocells.

Some manufacturers, such as Hyson Cells of South Africa, offer structures labelled as "geocells" with very thin wall thicknesses of 0.2 mm. However, those structures are much too delicate for field application, are subject to collapsing during infilling (installation damage), and do not have sufficient strength for long term applications (including proper safety margins).

Some other manufacturers make geocells from nonwoven fabric. The price for these geocells is not better than extruded polymer (per unit weight). Such geocells are also not stiff enough to avoid collapse of walls during the infilling process. Moreover, when polyester fabric is used, the geocell tends to hydrolyze when used with concrete, lime and alkaline infill materials.

Most geocells are manufactured by firms that have expertise in plastic sheet extrusion, but have poor knowledge in geotechnical engineering. These manufacturers tend to indicate in their promotional material various technical and physical capabilities of their extrusion equipment, including, among others, the potential to produce strips from about 0.5 mm to 1.8 mm. However, these ranges appear to be directed to the extruded plastic product itself. No commercial geocell products having such low wall thicknesses have been designed or offered for sale.

Some academic studies examined geocells having a cell wall thickness of about 0.2 mm. These studies were purely academic and were not offered as a commercial product, and did not suggest such a product should be made.

There is a need to provide a well-balanced geocell product having sufficient mechanical and physical properties and yet significantly (1) less expensive per unit expanded area and (2) easier and less expensive to install and (3) less expensive to be shipped than current geocells with wall thicknesses of 1.0 mm to 1.7 mm according to prior art.

Figure 5:
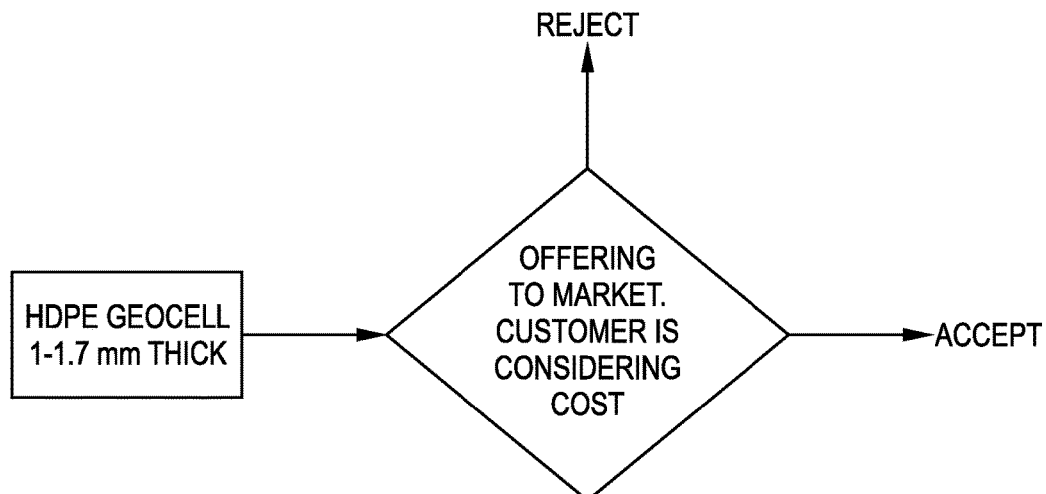
FIG. 5 is a flowchart showing how prior art geocells are sold.

FIG. 5 is a flowchart showing how prior art geocells are sold. The wall thickness of the geocell is predetermined, and when offered to a potential customer, the geocell product is either accepted or rejected. In most projects, the total geocell cost (product cost, shipment cost, and installation cost) exceeds the market's willingness to pay, due to the availability of other lower cost solutions.

Figure 6:
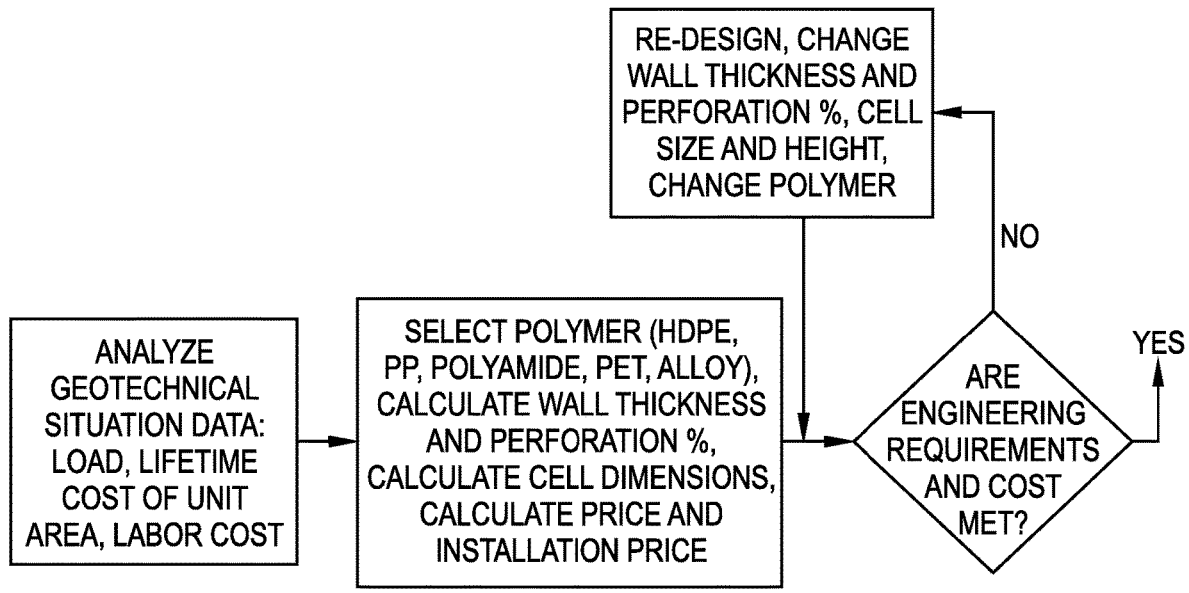
FIG. 6 is a flowchart showing how the geocells of the present disclosure are optimized to meet specific market needs.

FIG. 6 is a flowchart showing how the geocells of the present disclosure are optimized to meet specific market needs. The specific geotechnical situation for a given project is analyzed prior to product manufacturing. Factors such as the load level and distribution, the design life of the project, in-situ temperature levels, drainage, type of infill, and labor cost are considered. It is important to note that infill has a dramatic effect on load distribution. For example, concrete is sometimes used as the infill in channels. Concrete can bear most of the required load, and thus a lower strength cell wall may be permissible. On the other hand, softer infill like sand and native soil, especially when exposed to large deformations, cannot bear high loads. As a result, a geocell may require a greater cell wall thickness, and sometimes more advanced polymers, such as polyamide, polyester or alloys, must be used instead of HDPE.

Once the geocell is designed, the cost of the geocell product (usually in dollars per unit of expanded area) and the installation cost are calculated and compared to the requirement for the specific application. If met, the solution can be offered to the customer, at a very high level of acceptance. If the specific application requirement is not met, then the geocell is redesigned until engineering requirements are met.

As referred to herein, the "geocell wall strength" is calculated according the following procedure. A strip is cut from a geocell wall, to a length of at least 100 mm, preferably coming from an area adjacent to a seam. The strip is tested for the load at yield or the load at break, whichever is the first to occur. The strip is tested in the direction perpendicular to the seam. The strain rate is adapted so the ratio between {deformation rate (mm/minute)} and {distance between clamps in mm when test starts} is 150:100, or in other words, the strain rate is 150%/min. The measured load at yield or break in Newtons (N) is divided by the strip width (corresponding to the cell wall height), in meters. The result is the actual offered geocell wall strength, in N/m.

When the geocell is expanded and infilled, the geometry of each cell is fixed. When stresses and loads are applied on a geocell, the cell wall is subjected to tensile loads, while the seams are subjected to splitting forces. The measurement of splitting resistance is according to ISO 13426-1 (method C). The term "seam splitting strength" is used herein to refer to the load that causes the seam to rupture according to ISO 13426-1 (method C), normalized to units of N/m.

The present disclosure may provide a geocell having geocell wall strength, measured at 23 degrees Celsius, of at least 3500 N/m (three thousand five hundred) and at most 15000 N/m (fifteen thousand). The present disclosure may also provide a geocell having geocell wall strength, measured at 23 degrees Celsius, of at least 3500 N/m and at most 9000 N/m.

In some embodiments, a geocell having a wall strength, measured at 23 degrees Celsius, of at least 3500 N/m and at most 9000 N/m, is useful for: (1) channel lining where water flow is medium or low (less than about 6 m/sec) and where the stake density is at least 1 per square meter; (2) for reinforcement of subgrade of pavements, railways and parking yards; (3) for tree root protection; (4) for walkways and bicycle paths; (5) for moderate slopes and/or short slopes; (6) private car lots; (7) vegetated roof covering; (8) protection of water proof lining of ponds, reservoirs and landfills; (9) dams and floodgates against floods and overflowing; (10) barriers to stop soil erosion; and (11) terraces for management of soil sediment.

The present disclosure may also provide a geocell having a geocell wall strength, measured at 23 degrees Celsius, of at least 7500 N/m and at most 15000 N/m. Such a geocell is useful for (1) reinforcing certain bases, sub-bases and sub-grades of pavements, parking yards and railways; (2) for slopes, including of medium and steep slopes, where stakes are applied at a density of greater than 0.65 per square meter; (3) for retaining walls, including those having a slope of up to 85 degrees; and (4) for channel linings where water flow is medium-high (in the range of 6-12 m/sec) and when stake density is at least 0.65 per square meter.

The present disclosure also provides a geocell having a geocell wall thickness (measured according to ASTM D5199) of 0.25 mm to 0.95 mm. At this wall thickness range, when the geocell is made of HDPE, PP, or alloys of these polymers with other polymers such as polyamide or polyester, sufficient strength for moderate or low load applications is provided.

The geocells having a wall strength measured at 23 degrees Celsius of at least 3500 N/m and at most 15000 N/m are not suitable for heavy loaded pavements bases; for retaining walls having an angle greater than 85 degrees; channels where the flow rate is greater than 12 m/sec and the stake density is equal or lower than 0.65 per square meter; or for slopes of greater than 55 degrees where the slope length is greater than 25 meters and stakes are installed at a density of 0.65 per square meter or less. Such geocells should only be used in applications with low or moderate loads.

Polymeric geocells having a cell wall thickness of lower than 0.25 mm do not have sufficient resistance to the cell walls collapsing during infilling (installation damage).

Thin wall geocells made of woven or non-woven fabrics typically tend to collapse during infilling (installation damage). When the fibers are made of polyester, such fabrics also tend to hydrolyze when in contact with alkaline soil or infill (poor chemical resistance).

The geocells of the present disclosure, even at cell wall thicknesses of 0.25 mm, are stiff enough to enable infill without collapsing (i.e. resist installation damage), and preferably when the wall thickness is from 0.35 mm to 0.8 mm, has very good resistance to installation damage, with performance sufficient to the needs of particular applications. The preferred polymers for making the geocells according to the present disclosure are high density polyethylene (HDPE), polypropylene (PP), and alloys thereof with polyamide or polyester.

The present disclosure also provides a geocell having geocell wall thickness (measured according to ASTM D5199) of 0.25 to 0.75 mm. At this wall thickness range, when the geocell is made of HDPE, PP or alloys thereof with polyamide or polyester, the wall strength is sufficient for moderate load or low load applications. Examples of such applications include: certain pavement subgrade reinforcement; walkways; bicycle paths; slopes of lower than 45 degrees or slopes where the stake density is greater than 1.0 per square meter; tree root protection; channels serving low water flow rates in the range of lower than 6 m/sec; vegetated roof covering; and protection of liners of reservoirs, ponds or landfills; dams and barriers; terraces; and walls of less than 80 degrees slope and less than 10 meters in height.

The present disclosure also provides a geocell having a geocell wall thickness (measured according to ASTM D5199) of 0.25 to 0.55 mm. At this wall thickness range, when the geocell is made of HDPE, PP or alloys thereof with polyamide or polyester, the wall strength is sufficient for low load applications. Examples of such low load applications include: certain pavement subgrade reinforcement; walkways; bicycle paths; slopes of lower than 35 degrees or slopes where the stake density is greater than 1.0 per square meter; tree root protection; channels having low water flow rates of less than 4 m/s; vegetated roof covering; protection of liners of reservoirs, ponds or landfills; dams and barriers; terraces; and walls of less than 75 degrees slope and less than 6 meters high.

By lowering the geocell wall thickness below 0.95 mm, more preferably below 0.85 mm, and most preferably below 0.7 mm, a novel combination of properties is obtained. First, the geocells are easier to install. Less manpower and less effort is required to expand the geocell and stake them to maintain the expanded structure during infilling. This is due to the lower weight and lower resistance to expansion of each geocell section. Each section can be made to cover a larger area, thus fewer connections between adjacent geocell sections may also be required. Shipping costs per unit area are lowered. The geocell product cost is lowered proportionally to the unnecessary polymer saved. These savings are significant relative to the total cost of prior art geocells of prior art, and may vary from 20 to 80% of the total cost (geocell cost+shipment+installation).

In certain applications such as erosion control, dams, terraces, vegetated roofs, root protection, erosion barriers, and waterproofing lining and channels, the lowered cell height for such geocells may be compensated for by using smaller cell sizes (i.e. the distance between seams in the unexpanded state is less than 330 mm). This novel combination is practically not possible with prior art geocells, due to the expansion resistance from thicker cell wall geocells. Thus another benefit of the present disclosure is that the distance between seams (in the compressed or non-expanded state) may be as little as 200 mm, and yet the present geocells can be practically used even under sub-zero temperatures where prior art geocells are almost impossible to expand. Smaller cell sizes work better for protecting against erosion.

One major benefit of the geocells of the present disclosure is easier and more economical installation. Typical HDPE prior art geocells (having wall thickness of 1.0-1.7 mm) need multiple persons in order to expand each section, and need many stakes to maintain each geocell section in an expanded state. Because each section is heavy, the connecting of adjacent sections is a time and labor consuming task. Because the bending resistance of a structure increases by a power law function as the cell wall thickness increases, and said resistance is further increased as temperatures drop, the geocells of the present disclosure are significantly easier to expand, connect and maintain in an expanded state during installation compared to prior art geocells.

Accordingly, the present geocells having a cell wall thickness of 0.25 mm to 0.95 mm, are much easier to expand, so one or two persons are sufficient. The number of stakes required in order to maintain the geocell in an expanded state during the installation process, is about 30% to 70% of the number required for prior art geocells. Because more expanded area can be actually loaded on each pallet, fewer trips are required between the location where the geocell is stocked and the location where the geocells are deployed/installed. It is known among contractors that the high cost of geocell installation is a deterrent factor to project managers, so they usually quote an additional margin of between 40-100% of geocell cost in order to discourage the use of geocells. The thinner wall geocells of the present disclosure minimize this problematic situation. When tested in the field, the number of trips between the stock site and installation point was reduced by 50% or more, and the installation cost was reduced by 30-65%.

Another problem related to prior art geocells is that unfortunately, geosynthetic products are in many cases manufactured far from the project location and must be shipped for very long distances. Prior art geocells have significant cost per pallet and per shipping container, which is a noticeable factor in the total cost. Another advantage related to the present geocells having wall thicknesses of 0.25 to 0.95 mm is that they are much lighter and require much lower pre-expanded volume per unit expanded area, thus more expanded area can be delivered in every pallet/container. The result is a savings in shipping cost (in dollars per unit expanded area) of 20% to 80%.

In some additional embodiments, the geocell may be made from a degradable polymer. A polymer is considered to be "degradable" if it loses more than 50% of its original geocell wall strength after being exposed to outdoors conditions for five years or more. Examples of degradable polymers are (1) blends of HDPE and PP with starch and other polysaccharides, (2) polylactic acid (PLA), (3) blends of PLA with polyolefins, (3) natural fiber blends, (4) fabrics; and (5) alloys, compounds, or blends containing such degradable polymers.

The geocells of the present disclosure may be perforated. In other words, hole or openings are provided in the cell walls. This permits materials from one cell to enter an adjacent cell. For example, this can allow water to flow through the cells down a slope. As another example, the roots of vegetation can grow through such perforations to serve as another anchor. Alternatively, tendons or rods can be inserted through such perforations as well. The geocells of the present disclosure may be embossed to provide a texture to the geocell wall which can aid in increasing friction. In some embodiments, though, the geocells are not embossed. Of course, geocells can be perforated and embossed if desired.

The present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLES

Preparation of Geocells According the Present Disclosure

Different geocells according to the present disclosure, designed for medium load, were made at four different cell wall thicknesses and from two different materials: HDPE (TUB 121 manufactured by Inova) and PP copolymer (SE50E manufactured by Carmel Olefines). The maximal load at yield (cell wall strength) was measured, as well as seam splitting strength according to ISO 13426-1 (method C). The data for cell wall strength is summarized in Table 1A (highest value for non perforated, lowest for highly perforated, tested at strain rate of 150%/min at 23 degrees Celsius).

The data for seam split strength is summarized in Table 1B. When comparing Tables 1A and 1 B, the geocell cell wall will fail at the strip rather than the seam at strength ranges of 2800-8000 N/m for perforated HDPE geocells, 4600-14500 N/m for non-perforated HDPE geocells, 3400-10000 N/m for perforated PP geocells, and 5800-17300 N/m for non-perforated PP geocells. Thus, the geocells of the present disclosure are different from prior art geocells which fail at the seam. The result is a much more balanced and fine tuned geocell, where the strength/cost ratio is maximized.

TABLE 1A

| Polymer | wall strength (N/m) - wall thickness 0.25 mm | wall strength (N/m) - wall thickness 0.4 mm | wall strength (N/m) - wall thickness 0.55 mm | wall strength (N/m) - wall thickness 0.7 mm | wall strength (N/m) - wall thickness 0.85 mm |
|---|---|---|---|---|---|
| HDPE | 2800-4600 | 4500-7500 | 6000-10000 | 8000-14500 | 9500-16000 |
| PP | 3400-5800 | 5500-9500 | 7500-12600 | 10000-17300 | 11500-19500 |

TABLE 1B

| Polymer | Seam split strength (N/m) - wall thickness 0.25 mm | Seam split strength (N/m) - wall thickness 0.4 mm | Seam split strength (N/m) - wall thickness 0.55 mm | Seam split strength (N/m) - wall thickness 0.7 mm | Seam split strength (N/m) - wall thickness 0.85 mm |
|---|---|---|---|---|---|
| HDPE | 2800-4600 | 4500-7500 | 6000-10000 | 8000-14500 | 9500-14400 |
| PP | 3400-5800 | 5500-9500 | 7500-12600 | 10000-17300 | 10400-17500 |

The data in Table 1A and Table 1B is obtained for geocells made with virgin resin. When a geotechnical engineer is selecting a geocell for a specific design, the geocell wall strength and seam split strength are calculated according to the procedure below:

The calculated loads according to the geotechnical situation are multiplied by a safety factor (known also as reduction factor) that typically varies between 1.2-2 for temporary applications and 2.7-5 for long term applications. The result is the allowed strength for design. The material type (HDPE or PP) and wall thickness are then selected according to Table 1A and Table 1B to meet the allowed strength for design.

Example 1: Medium Strength Geocell for Slope Erosion Control

Figure 7:
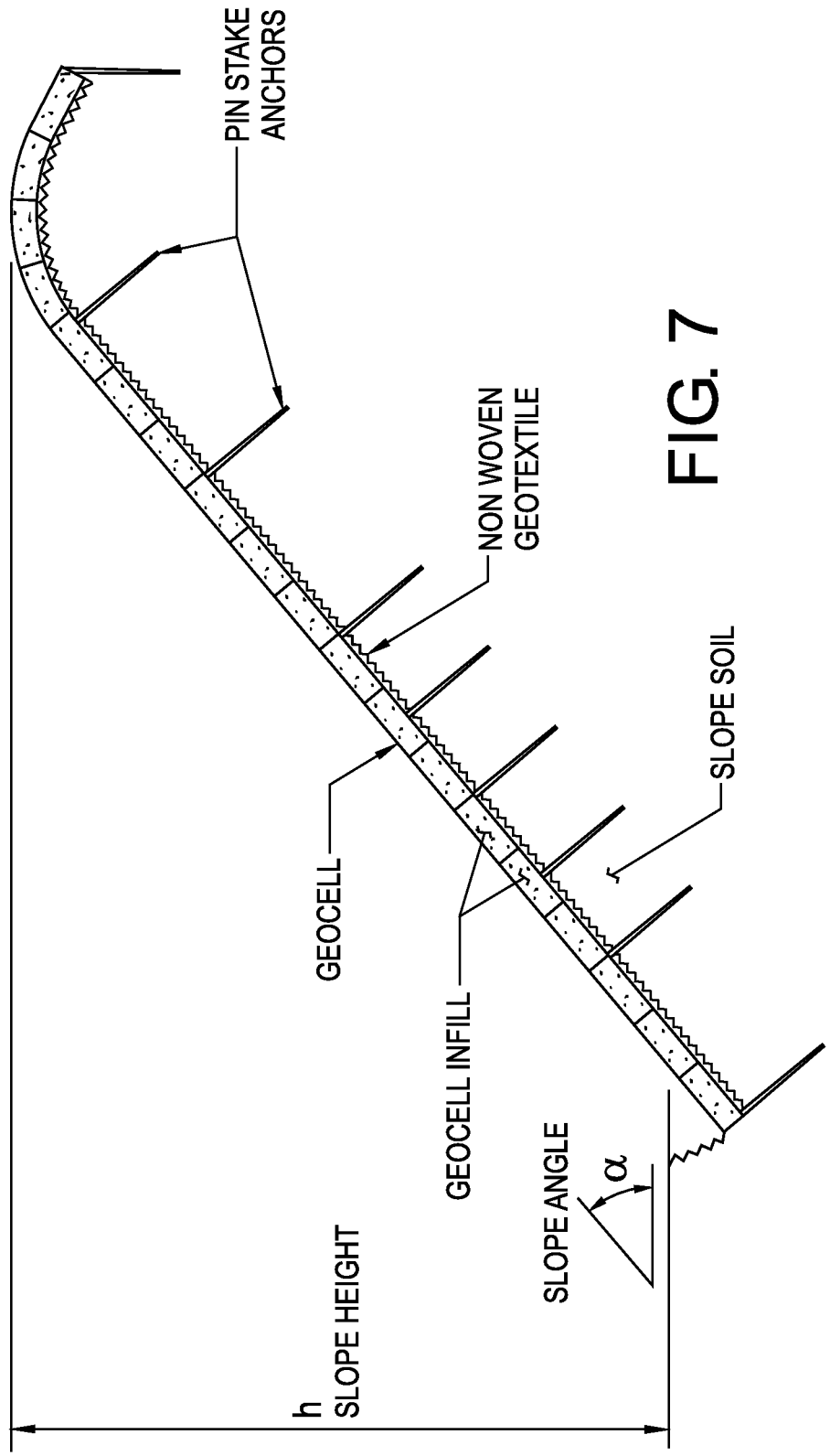
FIG. 7 is a schematic cross-section of a typical slope protected by a geocell, infilled with native soil or granular material.
Figure 8:
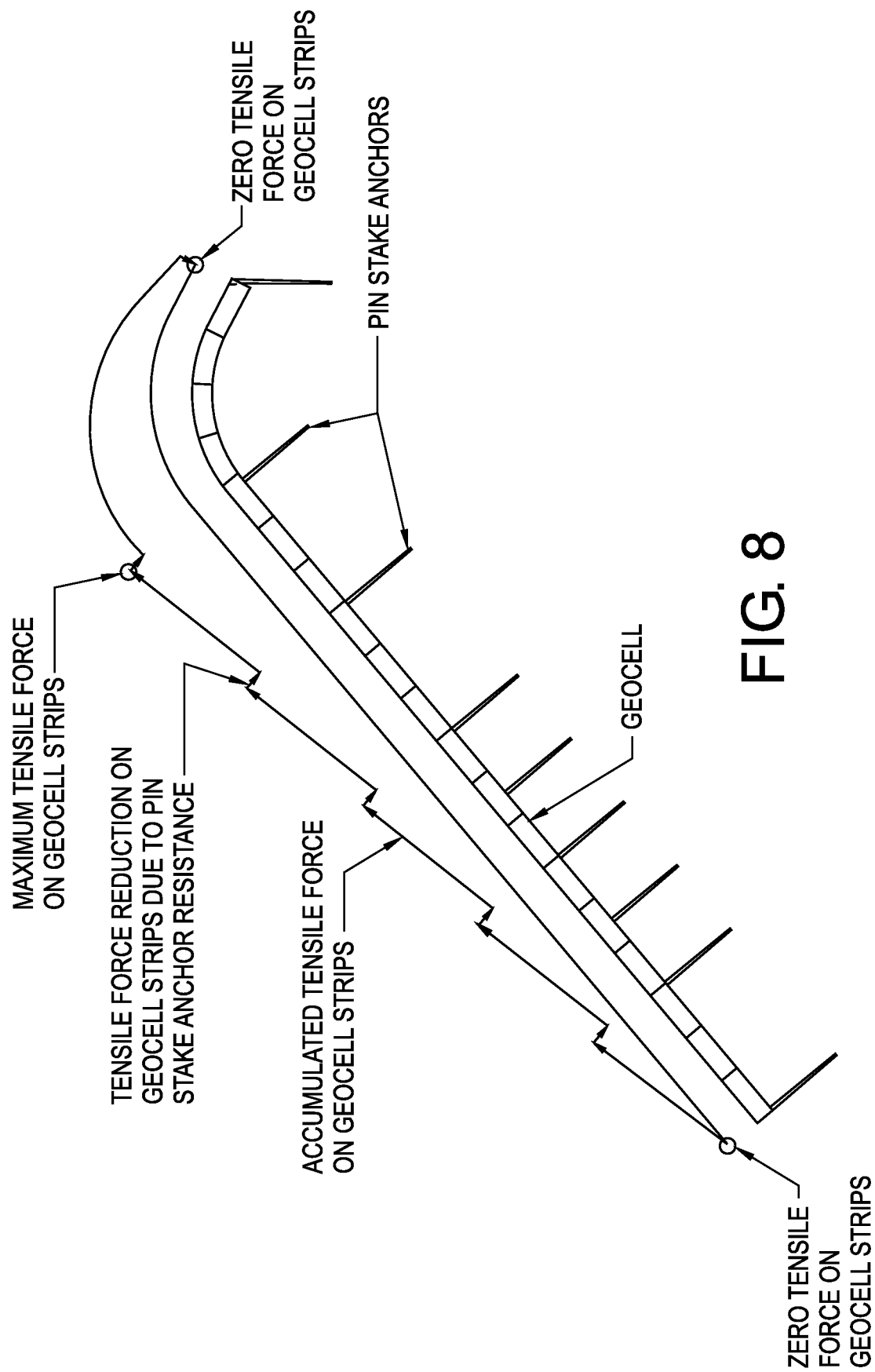
FIG. 8 is a schematic showing the different loads applied upon a geocell in slope protection.
Figure 9:
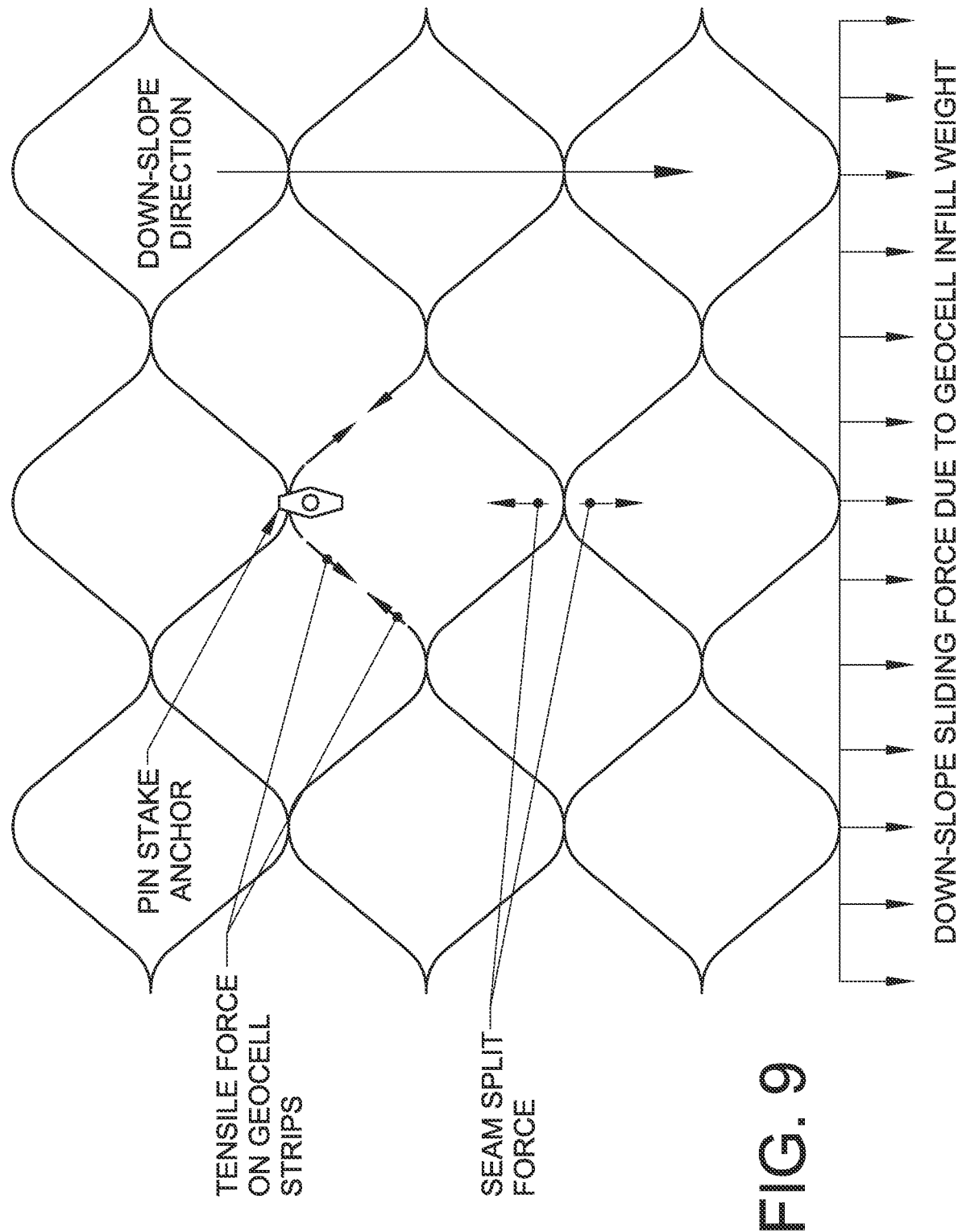
FIG. 9 is a top view of the geocell in slope protection, and shows how stresses are distributed.

A slope protection application utilizes the geocell as an erosion control system installed on top of a slope. FIG. 7 is a schematic cross-section of a typical slope protected by a geocell, infilled with native soil or granular material. FIG. 8 is a schematic showing the different loads applied upon a geocell in slope protection. This figure includes a line indicating zero tensile force. The height of the arrowed line perpendicular to this zero line indicates the load. FIG. 9 is a top view of the geocell in slope protection, and shows how stresses are distributed.

According to the present disclosure, the specific geocell design is optimized for the specific slope class on factors including:
Geometry: Height (h) and angle ($\alpha$)
Geocell infill properties: Friction Angle ($\varphi$) and Cohesion (C)
Number of pin stake anchors
Design life (which affects the reduction factor)

Calculation of the tensile forces applied on the geocell strips and split forces on seams, caused by the geocell infill weight, is compared to the geocell properties, and the geocell is optimized according, taking into account factors such as strip thickness, polymer type, degree of perforation, cell height, cell size, embossing depth, and amount of stabilizer. Table 1C shows the calculated load on the geocell wall and the load on the seam (splitting mode) at a typical and most common stake density of 1 per square meter:

TABLE 1C

| | 1 stake per square meter | |
|---|---|---|
| Slope Height, h [m] | load on strip (N/m) | Seam splitting load (N/m) |
| 2 | 1070 | 1500 |
| 4 | 1070 | 1500 |
| 6 | 1070 | 1500 |
| 10 | 1070 | 1500 | cell size—356 mm and cell height—75 mm filled with poor material at 30° slope angle. 1 stake per square meter.

The term "cell size" as used herein refers to the distance between seams when the geocell is in a non-expanded state (i.e. prior to expansion to cover a large area where the cells have volume).

It is important to pay attention to the fact that the load on the seams is greater than the load on the strips (1500 vs. 1070). Thus, the selection of an appropriate geocell is based on the seam split strength of the geocell. Since on slopes and walls, the seams are loaded at higher load than the strip itself (see Table 1C), the geocells of the present disclosure are more balanced and optimized than prior art geocells.

From Table 1C, when multiplying these values by a reduction factor of 3 for long term applications (i.e. 3210 and 4500), and comparing the calculated seam split strength to the values in Table 1 B, it is clear that:

A non-perforated HDPE geocell or a non-perforated PP having a wall thickness of 0.25 mm provides the required seam strength. Usually, however, geocells will have a minimum thickness of 0.3 mm to provide additional strength for infilling.

A highly perforated HDPE geocell with a wall thickness of 0.4 mm would be sufficient to provide the required seam strength.

A highly perforated PP geocell of wall thickness of 0.4 mm would be sufficient.

It is seen in this example that a significant savings in product cost, weight, installation ease, and cost of freight can be achieved with geocells of the present disclosure, relative to prior art geocells having a wall thickness of 1 mm or more.

Example 2: Medium Strength Geocell for Walls

Figure 10:
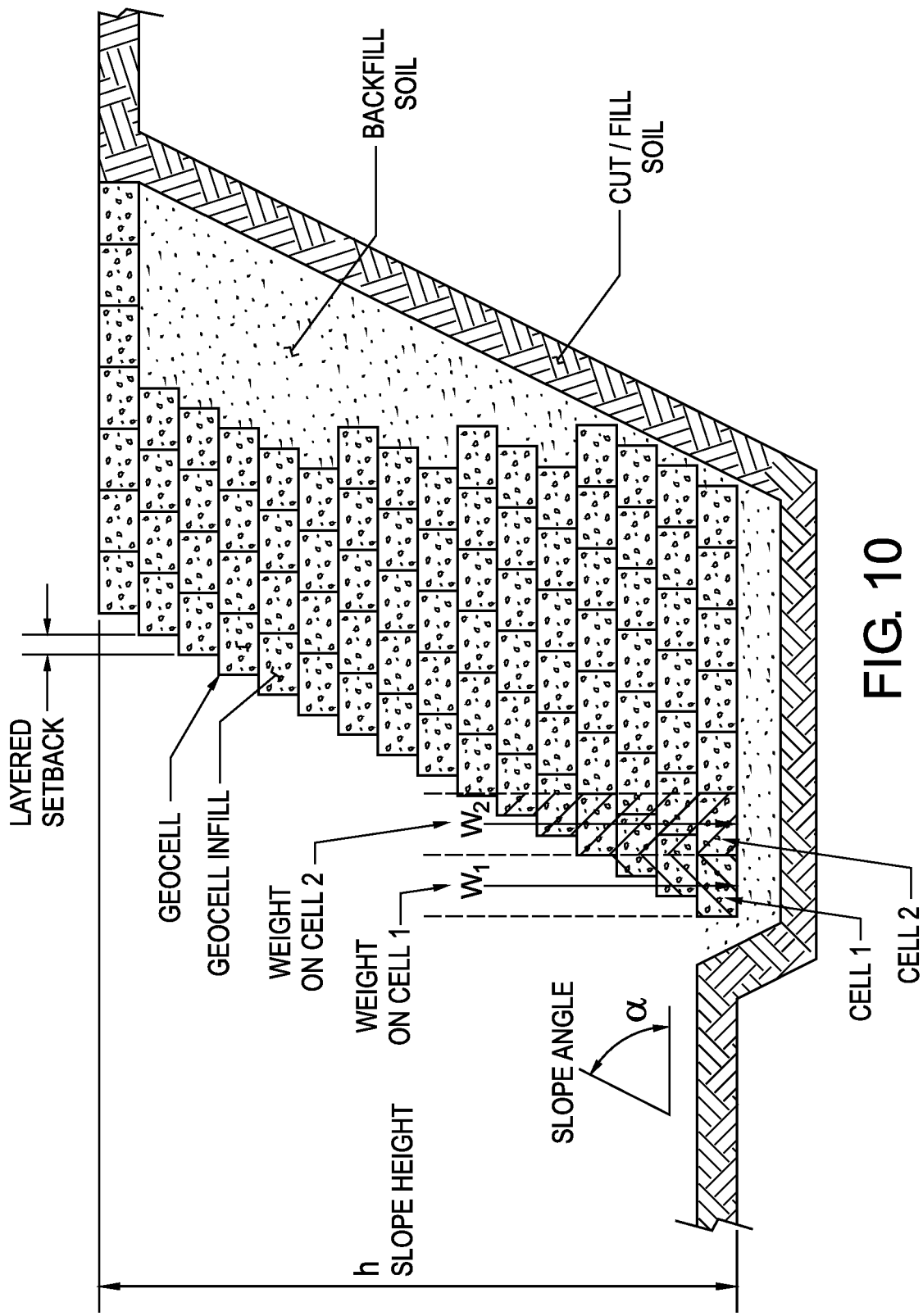
FIG. 10 is a schematic diagram of a typical earth retention application.

An earth retention application utilizes the geocell system to globally and locally stabilize steep slopes. Geocell layers are placed horizontally one on another with a layered setback. The major factors affecting wall design are:
Geometry: Height (h) and angle ($\alpha$)
Geocell infill properties: Friction Angle ($\varphi$) and Unit Weight ($\gamma$)
Design life A schematic diagram of a typical earth retention application is provided in FIG. 10. The area labeled "Weight on Cell 2" represents the second cell row that is subjected to high loads, but a load which is lower than the load on the first cell row labeled "Weight on Cell 1", which is loaded by the highest loads. Calculations of the load on strips of the highest loaded cells (under worst case scenario conditions) are summarized in Table 2.

TABLE 2

| Wall Angle, $\alpha$ [°] | Wall Height, [m] | Tensile load on strip [N/m] | Seam splitting load [N/m] |
|---|---|---|---|
| 45.0 | 50 m | 594 | 840 |
| 45.0 | 6 m | 594 | 840 |
| 81 | 50 m | 3,186 | 4,505 |
| 81 | 6 m | 3,186 | 4,505 |
| 90 | 3 m | 5,500 | 7,778 |
| | 6 m | 11,000 | 15,556 | calculated loads on strip and seam in geocells of rows 1 and 2, at different wall angles and heights. (Based on cell size—445 mm and cell height—200 mm filled with granular material)

Table 2 demonstrates an important and non-intuitive aspect of the mechanism of loads in walls. The wall angle is by far more important than the wall height. Indeed, up to a wall angle of about 81-85 degrees, the load is independent of height. The geocell walls are generally not perforated to avoid leaking of infill in these applications. Since the calculated load on seams is greater than the load on the strip, when taking the calculated load from Table 2 and multiplying by a reduction factor of 3, then comparing to Table 1 B, it is seen that:

For a wall angle of up to 45 degrees, a geocell of 0.25 mm wall thickness is sufficient for either HDPE or PP.

For a wall angle of up to 81 degrees (i.e. 4505*3=13515 N/m), a HDPE or PP geocell of 0.7 mm wall thickness is sufficient to support the load.

For a wall angle of greater than 81 degrees, geocells according to the present disclosure are not strong enough to support the load of 23,334 N/m (i.e. 7,778× 3).

If the wall is vertical, i.e. a slope greater than 85 degrees, stronger geocells with a greater cell wall thickness are required. In order to guarantee performance lifetime, only virgin resins should be used and recycled materials, such as offered by some manufacturers, should be avoided.

Example 3: Medium Strength Geocell for Walkways and Bicycles Pavements

An unpaved bicycle path application utilizes the geocell system to improve the granular pavement performance by incrementally increasing the strength, stiffness, and durability under repeated cyclic loading.

Figure 11:
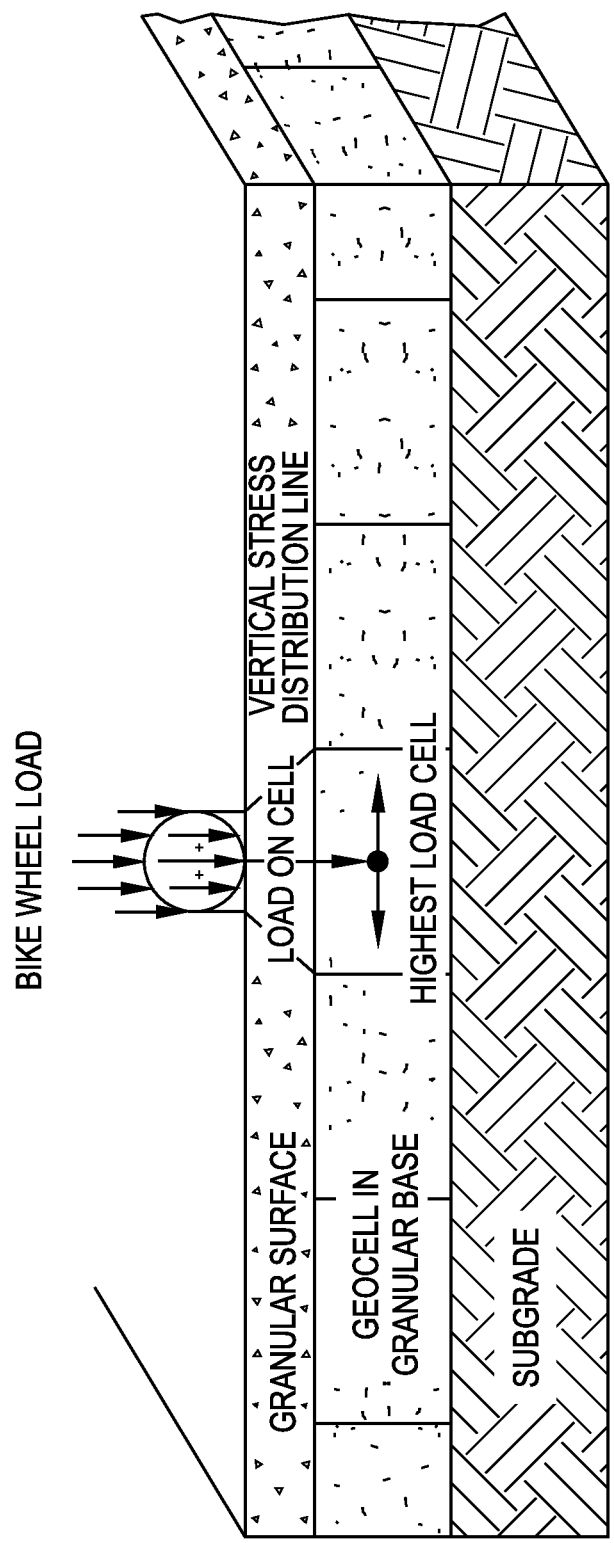
FIG. 11 is a schematic cross-section showing a typical walkway or bicycle path.

The geocell layer is placed in the surface granular layer (base layer). The following factors are considered:
Subgrade Strength: CBR/modulus (Ei)
Granular layers: thickness (hi), CBR/Modulus (Ei)
Design life FIG. 11 is a schematic cross-section showing a typical walkway or bicycle path. Calculation of the tensile forces applied on geocell strips and calculation of seam splitting strength forces on seams, caused by equivalent uniform circular load (bike wheel) on granular surface, are performed where the typical contact pressure of a wheel is 414 kPa (kilopascal).

Modelling the pavement structure and loading configuration was conducted according to conventional Layered Elastic Theory, providing the vertical stress in the most loaded cell, then calculating the lateral pressure and hoop tensile force.

Table 3 provides the calculated loads on geocell walls, based on cell size of 330 mm and cell height of 100 mm filled with granular material plus 50 mm overfill.

TABLE 3A

| Subgrade CBR [%] | Tensile load on Strips [N/m] | splitting load on seams [N/m] |
| --- | --- | --- |
| 3% | 2,050 | 2,900 |

Taking the loads calculated in Table 3A, a reduction factor of 3, and knowing that for pavements, low perforation is permitted, a comparison to Table 1B shows that HDPE geocells of 0.55 mm wall thickness or PP geocells of 0.4 mm wall thickness are sufficient for this application. Prior art geocells, having a wall strength of greater than 15000 N/m, are "overkill" and thus too expensive.

Figure 12:
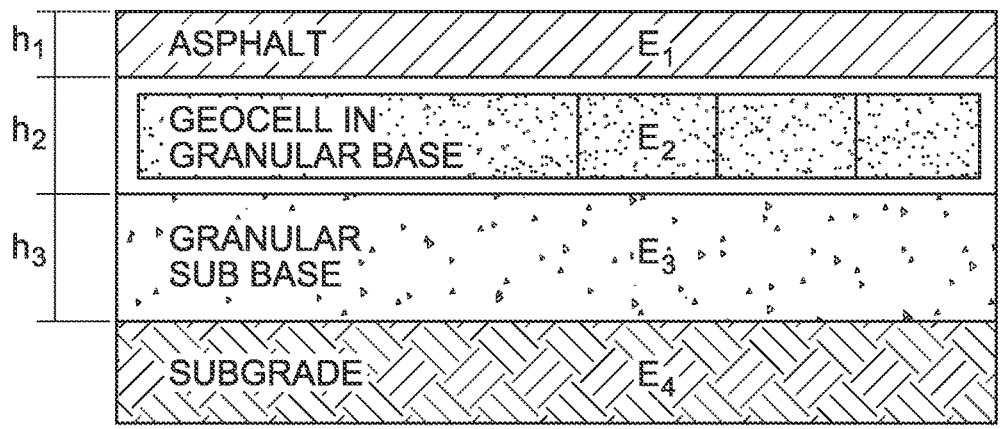
FIG. 12 shows a pavement design where the geocell is located in the base.
Figure 13:
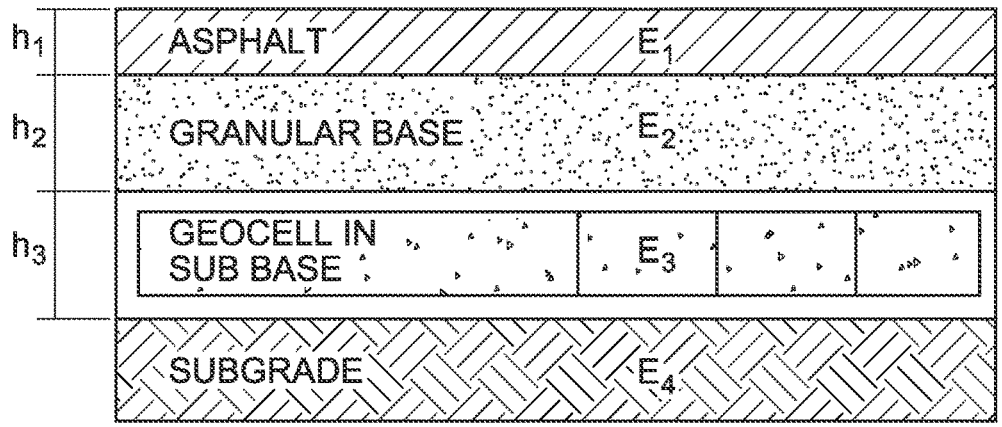
FIG. 13 shows a pavement design where the geocell is located in the sub-base.
Figure 14:
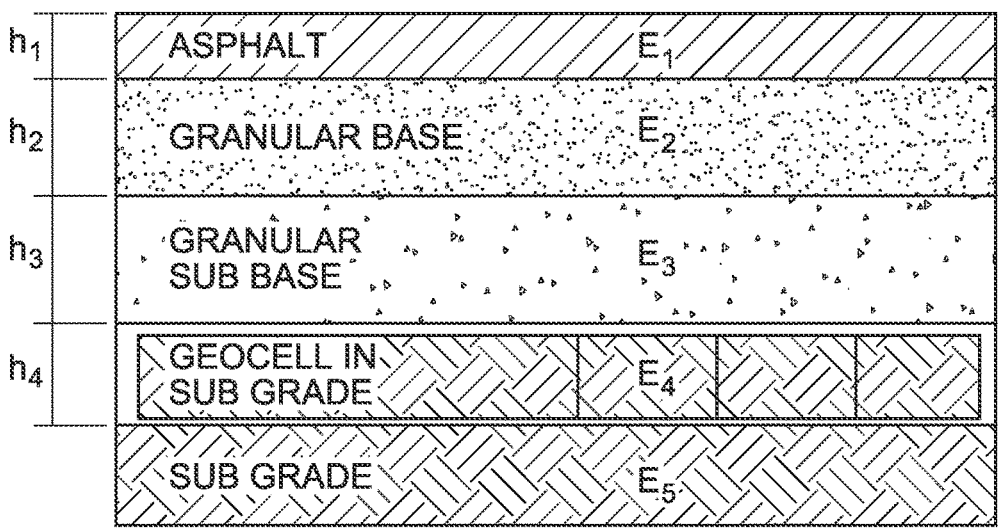
FIG. 14 shows a pavement design where the geocell is located in the subgrade.
Figure 15:
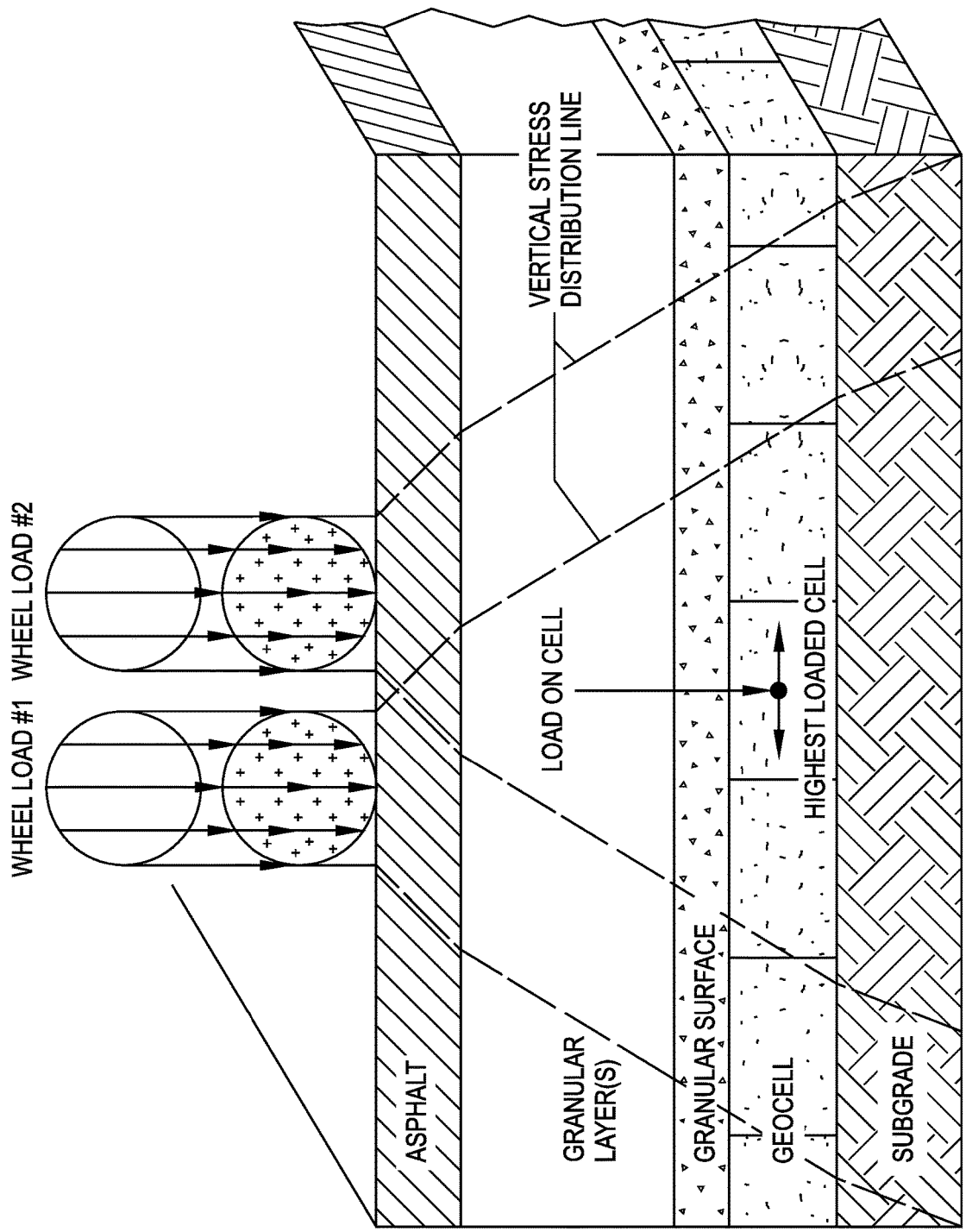
FIG. 15 shows the scheme of loads and stresses from the contact area of the wheels with asphalt, down to the different layers below.

Example 4: Medium Strength Geocell for Base, Sub-Base and Subgrade Reinforcement in Paved Roads FIG. 12 shows a pavement design where the geocell is located in the base. FIG. 13 shows a pavement design where the geocell is located in the sub-base. FIG. 14 shows a pavement design where the geocell is located in the sub-grade. FIG. 15 shows the scheme of loads and stresses from the contact area of the wheels with asphalt, down to the different layers below.

Calculation of the tensile forces applied on geocell walls and seam splitting forces, caused by uniform circular loads on asphalt surface, was done according to conventional Layered Elastic Theory, providing the vertical stress in the most loaded cell, then calculating the lateral pressure and hoop tensile force.

All scenarios below are based on cell size—330 mm and cell height—125 mm filled with granular material.

Calculation of load on geocell wall with geocell in base:
Pavement Configuration for High Volume Traffic: 100 mm asphalt, 175 mm geocell in granular base, 150 mm granular sub-base

TABLE 4A

| Subgrade CBR [%] | Traffic Volume | Tensile Force on strips [N/m] | Seam splitting load [N/m] |
| --- | --- | --- | --- |
| 10% | High | 2,850 | 4,000 |

Taking the loads calculated in Table 4A, a reduction factor of 5 (because high traffic loads) and knowing that for pavements, low perforation is permitted, and referring again to Table 1B, it is seen that the loads on the strip and seams are beyond the properties of the geocells of the present disclosure. Again, this is a high load application instead of a low or moderate load application.

However, for shorter design lifetimes, or for temporary pavements, where the reduction factor is 1.5-3, the geocells of the present disclosure may be suitable and provide better cost-performance than prior art geocells.

Calculation of load on geocell wall with geocell in sub-base:
Pavement Configuration for High Volume Traffic: 100 mm asphalt, 175 mm geocell in granular Base, 150 mm granular sub-base

TABLE 4B

| Subgrade CBR [%] | Traffic Volume | Tensile load on strips [N/m] | Seam splitting Force [N/m] |
| --- | --- | --- | --- |
| 5% | High | 1,600 | 2,200 |

Taking the loads calculated in table 4B, a reduction factor of 5 (due to high traffic loads), and knowing that for pavements, low perforation is permitted, and referring again to Table 1B, it is seen that:

HDPE geocells of 0.7 mm wall thickness, or PP geocells of 0.55 mm wall thickness, would be sufficient for temporary road sub-bases;

Thinner geocells according to the present disclosure would be suitable for temporary pavement sub-bases (which do not need such a large reduction factor).

Calculation of load on geocell wall with geocell in sub-grade:
Pavement configuration for High Volume Traffic: 100 mm asphalt, 150 mm granular base, 150 mm granular sub-base, 175 mm geocell in subgrade

TABLE 4C

| Subgrade CBR [%] | Traffic Volume | Tensile load on strips [N/m] | Seam splitting Force [N/m] |
|---|---|---|---|
| 2% | High | 800 | 1,100 |

Here, despite the fact the subgrade is weaker than the base in Table 4A, the loads in the sub-grade are lower than in the sub-base, because the base and the sub-base have already dissipated a major portion of the load. Taking the loads calculated in table 4C, a reduction factor of 5 (due to high traffic loads), and knowing that for pavements, low perforation is permitted, and referring again to Table 1 B, it is seen that HDPE geocells of 0.4 mm wall thickness or PP geocells of 0.25 mm wall thickness would be sufficient for temporary road sub-bases.

Example 5: Medium Strength Geocell for Lining of Channels

Figure 16:
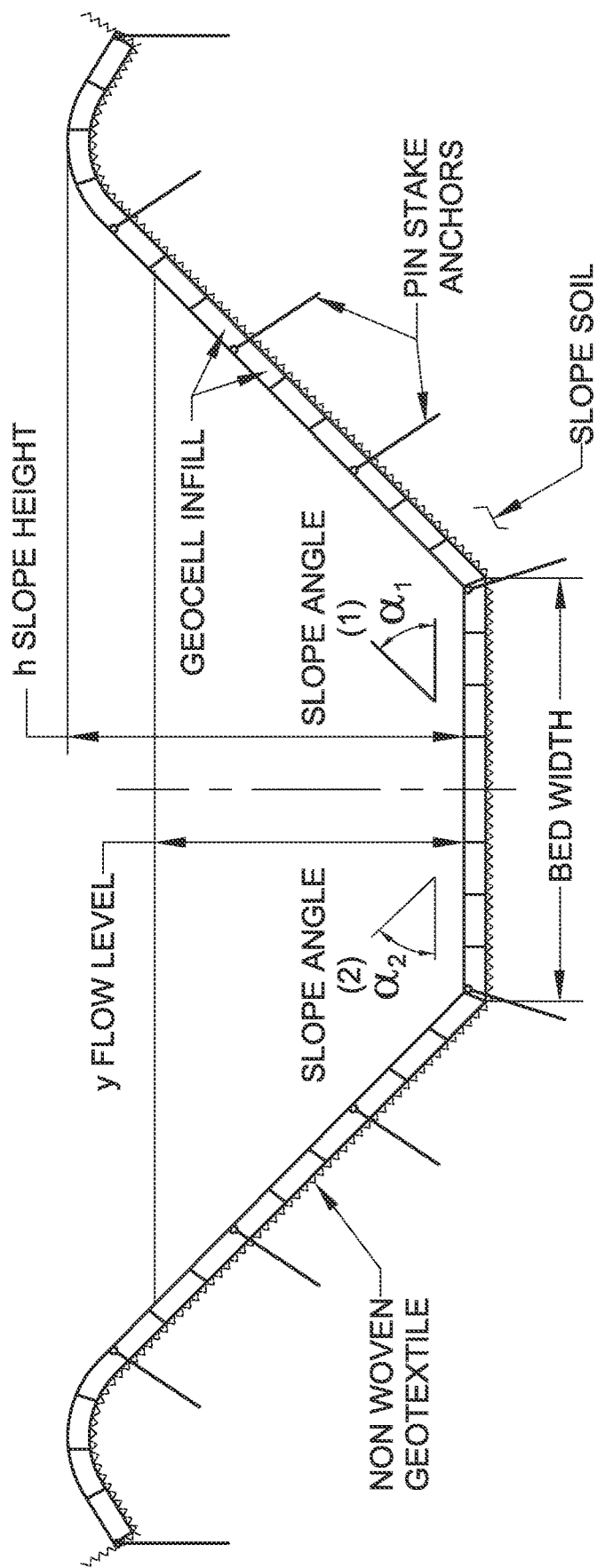
FIG. 16 is an illustration showing the deployment of geocells for channel lining.

This application has a similar geometry to slope stabilization, but here the geocells are filled with materials that resist the erosion caused by the water flowing in the channel. The system is subjected to longitudinal water flow and down-slope rainfall above water level. Typically infilling materials are concrete, gravel and ballast. FIG. 16 is an illustration showing the deployment of geocells for channel lining.

The basic factors affecting the design of geocell are:
Geometry: Height (h), Bed width, slope angles ($\alpha 1$, $\alpha 2$)
Geocell infill properties: Friction Angle ($\varphi$) and Cohesion (C)
Number of pin stake anchors
Flow velocity (v)
Flow level (y)
Design life
Calculations are made for the tensile forces applied on Geocell strips and seams caused by:
Down-slope Geocell infill weight
Longitudinal traction forces from water flow.
Calculations have been made for three flow situations, two slopes and two stake densities:
Geocell cell size is 356 mm (distance between welding), filled with concrete; flow level y=2 meters
Channel slope height is 3 meters with a moderate longitudinal curvature
Table 5 summarizes the calculated loads, organized by slope angle for the three flow situations. All the values in Table 5 are the calculated forces on the geocell strips and seam splitting strength force.

Taking the loads calculated in Table 5, a reduction factor of 3 and knowing that for channels, low perforation is permitted, and referring again to Table 1B, it is seen that:

For a slope angle of 30 degrees or lower, at flow rates of up to 10 m/s, and a stake density of 0.5 per square meter, a HDPE geocell of 0.7 mm wall thickness or a PP geocell of 0.55 mm wall thickness would be sufficient.

For a slope angle of 30 degrees or lower, at flow rates of up to 10 m/s, and a stake density of 1 per square meter, a HDPE geocell of 0.5 mm wall thickness or a PP geocell of 0.4 mm wall thickness would be sufficient.

Such geocells can be provided more economically than prior art geocells having a typical wall thickness of about 1.27 mm.

For a slope angle of 45 degrees or greater, geocells according to the present disclosure are suitable only for flow rate of lower than 3 m/sec and for a stake density of at least 1 per square m.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A geocell for moderate to low load applications, characterized by a geocell wall strength, measured at 23 Celsius, of at least 3500 N/m and at most 15000 N/m;
    wherein the geocell is formed from a plurality of polymeric strips bonded together along seams so that a honeycomb pattern is formed when the strips are expanded;
    wherein the geocell has a wall thickness of 0.25 mm to 0.95 mm, measured according to ASTM D5199; and
    wherein each polymeric strip is made of an alloy of (i) high density polyethylene or polypropylene with (ii) polyamide or polyester.

2. The geocell of claim 1, characterized by a geocell wall strength, measured at 23 Celsius, of at least 7500 N/m and at most 15000 N/m.

3. The geocell of claim 2, useful for (1) reinforcing bases, sub-bases and sub-grades of pavements, parking yards and railways; (2) slopes, including medium and steep slopes of up to 60 degrees, or where stakes are applied at greater than 1 per square meter (3) retaining walls, wherein the slope is at most 85 degrees; or (4) channels lining wherein water flow is less than 10 m/sec.

TABLE 5

| Slope Angle [°] | Flow Velocity Type | Flow Velocity [m/sec] | Geocell height [mm] | Tensile load on strips [N/m] 0.5 [stakes/sqm] | Tensile load on strips [N/m] 1.0 [stakes/sqm] | Seam splitting Force [N/m] 0.5 [stakes/sqm] | Seam splitting Force [N/m] 1.0 [stakes/sqm] |
|---|---|---|---|---|---|---|---|
| 30° | Low | v ≤ 3 | 60 | 2,200 | 1,100 | 3,100 | 1,500 |
|  | Moderate | v ≤ 6.5 | 75 | 2,500 | 1,300 | 3,600 | 1,800 |
|  | High | v ≤ 10 | 100 | 2,900 | 1,400 | 4,000 | 2,000 |
| 45° | Low | v ≤ 3 | 100 | 4,600 | 2,700 | 6,600 | 3,800 |
|  | Moderate | v ≤ 6.5 | 125 | 5,100 | 3,600 | 7,200 | 5,000 |
|  | High | v ≤ 10 | 150 | 5,500 | 3,900 | 7,800 | 5,500 |

4. The geocell of claim 1, characterized by a geocell wall strength, measured at 23 Celsius, of at least 3500 N/m and at most 9000 N/m.

5. The geocell of claim 4, useful for (1) channels lining where water flow is medium or low; (2) reinforcement of subgrade and sub-base of pavements, railways and parking yards; (3) tree root protection; (4) for walkways and bicycle pavements and (5) moderate slopes and/or short slopes; (6) private cars private lots; (7) vegetated roof coverings; (8) protection of water proof lining of ponds, reservoirs and landfill; (9) temporary pavements; or (10) dams, barriers and terraces.

6. The geocell of claim 1, characterized by a geocell wall strength, measured at 23 Celsius, of at least 3500 N/m and at most 6000 N/m.

7. The geocell of claim 6, useful for (1) channels lining where water flow is medium or low; (2) reinforcement of subgrade and sub-base of pavements, railways and parking yards; (3) tree root protection; (4) for walkways and bicycle pavements and (5) moderate slopes and/or short slopes; (6) private cars private lots; (7) vegetated roof covering; (8) protection of water proof lining of ponds, reservoirs and landfill; (9) temporary pavements; or (10) dams, barriers and terraces.

8. The geocell of claim 1, wherein walls of the geocell are textured or smooth.

9. The geocell of claim 1, wherein walls of the geocell are perforated or non-perforated.

10. The geocell of claim 1, being formed from a plurality of polymeric strips bonded together along seams so that a honeycomb pattern is formed when the strips are expanded, wherein a distance between seams in an un-expanded state is at least 200 mm.

11. The geocell of claim 1, having a cell height of at least 25 mm.

12. The geocell of claim 1, wherein the geocell is made of a degradable polymer.

13. A geocell stabilized slope, wall, channel, pavement base, pavement sub-base, pavement sub-grade, root-protection system, vegetated roof, walkway, bicycle lane, or car parking lot, wherein at least 1 square meter is stabilized or reinforced by the geocell of claim 1.

14. A waterproof lining for reservoirs, ponds and landfills, wherein at least 1 square meter is stabilized or reinforced by the geocell of claim 1.

15. A geocell reinforced dam and floodgate against floods and overflowing, barrier to stop soil erosion, or terrace for management of soil sediments, wherein at least 1 square meter is stabilized or reinforced by the geocell of claim 1.

* * * * *